United States Patent [19]

Neumann et al.

[11] Patent Number: 5,766,663
[45] Date of Patent: Jun. 16, 1998

[54] METHOD AND APPARATUS FOR SHAPING PRETZELS

[75] Inventors: Andreas Neumann; Attila Vranyoczky, both of München, Germany

[73] Assignee: Hans-Werner Hausdorf, Munich, Germany

[21] Appl. No.: 604,973

[22] PCT Filed: Sep. 28, 1994

[86] PCT No.: PCT/EP94/03238

§ 371 Date: Mar. 20, 1996

§ 102(e) Date: Mar. 20, 1996

[87] PCT Pub. No.: WO95/08921

PCT Pub. Date: Apr. 6, 1995

[30] Foreign Application Priority Data

Sep. 28, 1993 [DE] Germany ............... 43 32 989.6
Mar. 18, 1994 [DE] Germany ............... 44 09 397.7

[51] Int. Cl.$^6$ ............................................. A21C 3/08
[52] U.S. Cl. ................... 426/499; 426/500; 426/512; 426/517; 425/323; 425/391; 425/403; 425/470
[58] Field of Search ........................... 426/499, 500, 426/512, 517, 143, 514; 425/323, 391, 403, 470

[56] References Cited

U.S. PATENT DOCUMENTS

| | | |
|---|---|---|
| 2,114,951 | 4/1938 | Young et al. ............... 425/323 X |
| 5,009,910 | 4/1991 | Zwicker ............... 426/500 X |
| 5,492,708 | 2/1996 | Hemmerich ............... 426/500 X |
| 5,494,428 | 2/1996 | Piller ............... 425/323 X |
| 5,556,660 | 9/1996 | Schutz ............... 426/500 X |
| 5,580,599 | 12/1996 | Fehr ............... 426/500 X |

FOREIGN PATENT DOCUMENTS

| | | | |
|---|---|---|---|
| 1151773 | 7/1963 | Germany | ............... 425/323 |
| 3208105 | 9/1983 | Germany . | |
| 3906310 | 9/1990 | Germany . | |

*Primary Examiner*—Milton Cano
*Attorney, Agent, or Firm*—Nixon & Vanderhye

[57] ABSTRACT

A method of producing pretzels which are shaped from straight lengths of dough (S) of essentially circular cross-section which have been cut to length. A length of dough (S) is introduced into a shaping device so that it lies partly on a first surface at a first level and partly on a second surface at the same level. The two surfaces are subsequently rotated with respect to each other and one is then folded over on to the other. In addition, the length of dough (S) is guided in a clearly defined way from the moment it is delivered to the shaping device by a feed device to the time the shaped pretzel is deposited on a suitable surface. The shaping device is designed to enable a large number of very uniformly shaped pretzels to be produced within a short time.

29 Claims, 14 Drawing Sheets

METHOD AND APPARATUS FOR SHAPING PRETZELS

This invention relates to a process and a device for producing pretzels from cut lengths of dough supplied in stretched form.

From DE 32 08 105 A1 a process and a machine for shaping a length of dough into a pretzel is known. There a straight length of dough is deposited on a holding body which is bent upward in a semicircular shape, by which the length of dough assumes a wave shape with the ends of the length pointing away from one another. The ends of the length are held between pairs of clamps which are then moved toward one another so that the length of dough is formed into an omega shape. The clamp arrangement is then turned 360°, by which twisting is accomplished. Then the holding body is swivelled forward and at the same time drawn back so that the transition sections of the length of dough are shifted to one side and the middle part of the length to the other side in order to shape the pretzel. With this device and according to the aforementioned process pretzels cannot be shaped in the desired precision and accuracy. Uncontrolled deposition on the holding body and even more bringing together the ends of the length of dough into an omega shape in relatively unguided manner do not allow any clear-cut, defined pretzel shape which is however desired by the customer. Entwining of the suspended ends of the length of dough with clamps to form the 360° twisting and subsequent swivelling and shifting of the parts of the device relative to one another takes place unguided such that a wide quality range of pretzels is possible. A large part of the pretzels formed in this way must be considered scrap and cannot be sold.

DE 39 06 310 A1 describes a device and a process for looping of pretzels from a cut length of dough with an especially thickened middle section and two free ends. The device described there consists essentially of two plates which are arranged to one another such that the first plate can turn 360° around its middle axis and the second plate can be folded around an axis which runs perpendicularly to the axis of rotation of the first plate onto the latter. The first plate thus has a shaping element which corresponds to the shape of a pretzel. Here on the one hand the first plate which carries one shaping element is rotated, in which there are no means at all for keeping the length of dough in its position so that it is doubtful whether after 360° rotation of the first plate the length of dough still lies on the plate. On the other hand, a swivel motion of the second plate is also accomplished here, in which the ends of the length of dough lie loosely on the second plate and in no way during swivelling are guided onto the first plate so that a satisfactorily shaped pretzel cannot be expected. The pretzel looping device described here on the other hand is expensive since here two plates must be moved for shaping and on the other hand it is still not reliable enough to produce a larger number of uniformly shaped pretzels in a quick succession.

DE 38 41 395 C1 describes a process and a device for producing pretzels using a photoelectric barrier which is used for measuring the length of the strand of dough and using a frame which can move in the feed direction of the length of dough for a mounting which is rotary positioned thereon with at least two movable suction cups and a control arrangement which controls the position of the suction cups as a function of the length of the dough strand measured beforehand. The device also has a swivel arrangement for the working platform which is used for shaping. In this case the longitudinal extension of the length of dough is measured to determine the position prescribed for the suction cups. The suction cups guided to the ends of the length of dough grip the ends of latter, then raise them and entwine them then on the basis of a rotary motion of a carrier to which the suction cups are attached with simultaneous translational displacement of the working platform. As in the two devices discussed above, defined guidance of the length of dough during shaping is impossible. Therefore due to the lack of guidance of the ends of the length of dough during shaping it is impossible to get beyond a low shaping rate, i.e., a low production rate of pretzels, since due to rapid turning and swivelling or displacement of the working platform the movement of the length of dough can no longer be controlled.

None of the devices known from the prior art for shaping pretzels are suitable for producing the pretzels which are today still generally made or looped by hand by bakers satisfactorily in a larger number and at a sufficient rate.

It is therefore the object of this invention to devise a process and a device for producing pretzels which overcome the disadvantages of the prior art and reliably produce pretzels in a large number within a short time and in constant quantity.

This object is achieved by a process for producing pretzels which are shaped from cut lengths of dough which are essentially round and which are supplied in stretched form by means of a shaping device and which are removed after shaping. In doing so the length of dough is partially fed to a first surface of a first plane of the shaping device and in part onto a second surface in the same plane, in which the middle area of the length of dough is placed on a shaping strip and after which one of the two surfaces is turned by 360° around a first axis which lies essentially in its plane. Then one of the two surfaces is swivelled onto the other surface around a second axis which lies perpendicularly to the first axis. The process according to the invention proceeds in the following process steps:

Shaping of the length of dough which lies on the plane of the shaping device roughly in the shape of an omega. Accordingly the two ends of the length of dough lie roughly symmetrically to the first axis which lies in the plane, the upper roughly circular part of the omega shaped length of dough abutting the shaping strip essentially on the first surface and the ends of the length of dough which lie roughly in a V-shape and which extend in the lower area of the omega as far as the next mutual approach (entwining area) lying essentially on the second surface. The second surface borders the first surface in a second axis which lies perpendicularly to the first axis. Then the ends of the length of dough which lie in a V-shape are held on the second surface and the second surface is turned about 360° around a third axis which lies parallel over the first axis so that the two ends of the length of dough are looped around one another in the entwining area. Then the second surface is swivelled by about 180° around a fourth axis which lies over and parallel to the second axis so that the entwining area is located within the originally roughly circular part of the length of dough and the ends of the length of dough lie partially on the circular part of the length of dough and the length of dough is in the form of a pretzel. Then the ends of the length of dough are detached from the second surface, the latter is swivelled back, and the length of dough is removed. Advantageously the third axis has a distance from the first axis of roughly one half of the thickness of the length of dough and the fourth axis has a distance of roughly the thickness of the length of dough from the second axis.

In one advantageous development of the process according to the invention the following are prefixed to the aforementioned process steps: The lengths of dough are delivered to a timed conveyor and then one length of dough at a time is transferred timed to a straightening and centering device.

In one advantageous development of the process according to the invention the length of dough can be straightened beforehand before being supplied to the timed conveyor. This is especially advantageous if the length of dough which is delivered from a preceding so-called strand machine should not be supplied to the timed conveyor with sufficient neatness. In this case straightening beforehand in two separate steps, specifically lengthwise straightening and transverse straightening, is advantageous for swift transfer of the length of dough. In order to facilitate straightening of the length of dough on the straightening and centering device which follows the timed conveyor, by straightening the length of dough beforehand to one side the production process can be significantly accelerated.

Then the length of dough is straightened, centered and delivered to the shaping device. To do this the length of dough is advantageously moved into a parallel position to the second axis. To center the length of dough in front of the shaping strip, its position relative thereto is ascertained and the length of dough is moved accordingly in its longitudinal direction until it lies centered in front of the shaping strip. The length of dough in this case is advantageously placed on a rocker, there moved into a position parallel to the second axis, and then moved back and forth by the rocker along the extended direction of the length of dough between at least two sensors which ascertain the positions of the ends of the length of dough on the rocker. Thereupon the middle of the length of dough is determined and the length of dough is centered in front of the shaping strip by moving the rocker lengthwise.

Advantageously, shaping of the length of dough is followed by a removal process which takes place in the following steps: Movement of the first surface from its first into a second position, raising of the length of dough shaped into the pretzel from the first surface and deposition of the length of dough on a carrier which forms a third surface. More favorably the ends of the length of dough are pressed down before lifting onto the circular part of the length of dough. The production process according to the invention can be controlled by a memory programmable control (SPS), in which different process steps can be initiated before the prior process steps are completed.

The length of the strand of dough measured in the centering process can be advantageously compared to a set length and it is then jettisoned from the first surface when there is an overly large deviation from the set value after shaping.

To execute the process according to the invention there is a shaping device with a first surface of a first plane, the surface formed as a shaping plate, and with a second surface formed as a retaining plate in the same plane, in which the retaining plate is supported to turn about 360° essentially around a first axis which lies in the first plane, and in which the retaining plate in a second axis which is perpendicular to the first axis borders the shaping plate and can swivel essentially around this second axis by about 180°. On the shaping plate is a roughly C-shaped horizontal shaping strip which is open toward the retaining plate surface and which is symmetrically divided by the first axis. On the side of the shaping plate which is opposite the retaining plate there is a folding table which lies in the first plane and on which two shaping flaps are supported which lie on both sides of the first axis and which can turn around the axes perpendicular to the first plane. The retaining plate advantageously has a recess which points to the open side of the C-shaped shaping strip and opposite the recess it has a raised shaping piece which is symmetrically divided by the first axis and which projects from the first plane. The shaping piece has two shaping surfaces which lie in planes which are in a V-shape to one another and which intersect in the plane of symmetry. On either side of the shaping piece in the area of the shaping surfaces on the retaining plate and/or in the shaping surfaces there is a retaining device. The retaining plate according to the invention can turn around a third axis which is parallel to the first axis and which lies above it and can swivel around a fourth axis which lies above a nd parallel to the second axis.

Other advantageous embodiments of the invention can be found in the subclaims.

One embodiment of t he device according to the invention is described below using drawings.

Figure 16:
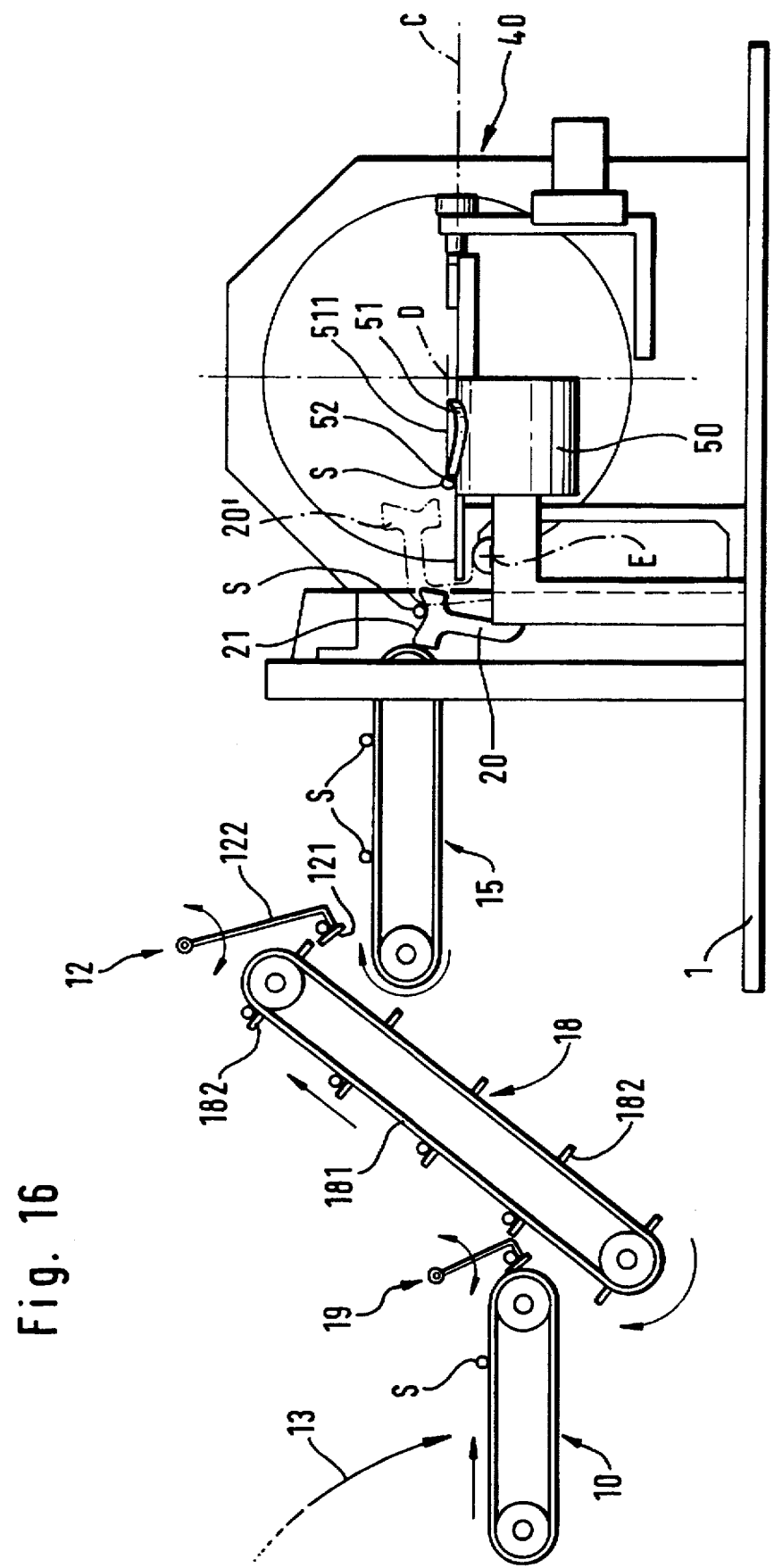

FIG. 16 schematically shows the shaping device, viewed in the direction of the second axis, with a preliminary straightening device and a lifting device.

Figure 1:
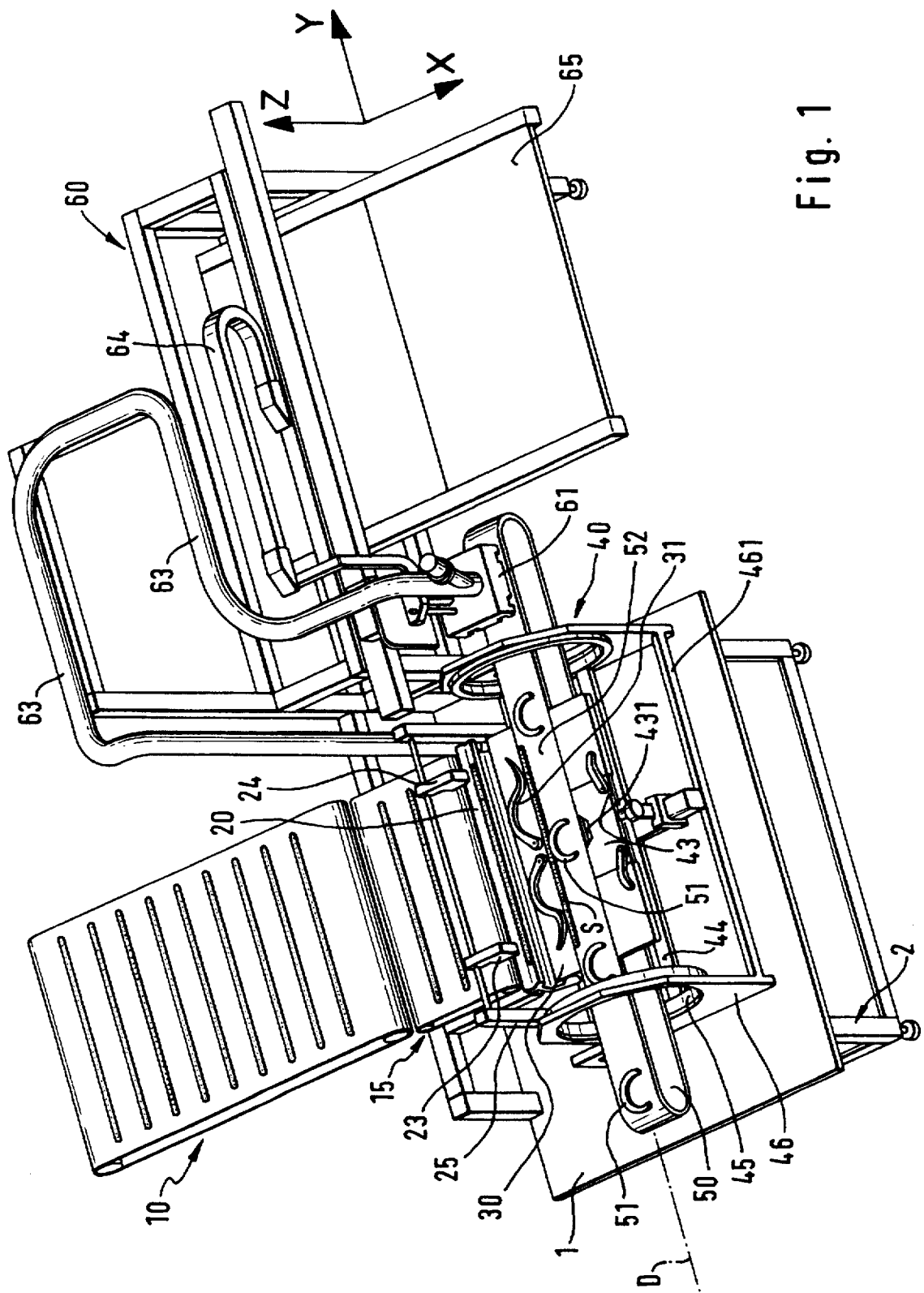
FIG. 1 shows a perspective view of one embodiment of the invention, incorporated between a feed unit and a removal unit before the shaping process.

FIG. 1 shows an arrangement of a pretzel shaping machine with feed means which consists of feeder 10, timed conveyor 15 and rocker 20. Feeder 10 is loaded by a preparation device, which is not shown, for cut lengths of dough delivered in stretched form and designed as a conveyor belt it preferably conveys the lengths of dough in a loose sequence onto timed conveyor 15. Timed conveyor 15 then continues to convey length of dough S until it drops onto dough support surface 21 of rocker 20, support surface 21 being slanted in its start position, and there comes to rest on arrangement 22 in a position parallel to it. After jettisoning a length of dough S, timed conveyor 15 remains stationary. That length of dough S which is now straightened is moved back and forth on rocker 20 between two sensors e.g., light scanners 23 and 24 such that light scanners 23 and 24 can ascertain the positions of the ends of length of dough S and report them to a memory-programmable control (SPS) (not shown). Then the SPS indicates a middle position of a length of dough S which is computed from the position information reported by the sensors. From this position, the length of dough S is conveyed onto belt conveyor 50 in that it is delivered by rocker 20 which moves around axis E (shown in FIG. 4) to shaping plate 52 of belt conveyor 50 so that it is located between shaping flaps 31 of folding table 30 and shaping strip 51 of shaping plate 52 of belt conveyor 50. Folding table 30, shaping plate 52 of belt conveyor 50 and retaining plate 43 of swivel means 40 all lie advantageously with their surface essentially in the same so-called first plane. Folding table 30 with shaping flaps 31 and the pertinent drive and belt conveyor 50 as well as swivel means 40 are located in the embodiment of the invention which is shown by way of example essentially in a cylindrical space which is described by ring bearings 45 which are located in stand 46 which rests on base plate 1. It can be easily recognized that belt conveyor 50 which carries shaping plate 52 represents a conveyor belt which extends parallel to the center of the ring bearings and on which there are C-shaped horizontal shaping strips 51 which are produced preferably from elastic material, similar to that of the conveyor belt. Base plate 1 stands on frame 2 which among others also carries mounting 25 for light scanners 23 and 24 and which is used by timed conveyor 15 as a foundation. The two halves of stand 46 which carry ring bearings 45 are joined by strips 461. Located on the ring bearings is crosspiece 44 which carries swivel means 40 so that swivel means 40 can be moved around the axis of rotation of ring bearings 45 which is called fourth axis D. On the right, next to right ring bearing 45, there is shown a gripper unit of removal means 60 which is formed as suction box 61 and which is moved onto shaping plate 52 of belt conveyor 50, the plate moved into the removal position (second position) in order to accommodate a finished pretzel in this position and to then deposit it on carrier 65 according to the arrangement of the SPS in a defined position. Suction box 61 is connected to a partially elastic suction line 63 which is suddenly supplied with negative pressure which is preferably produced by a side channel compressor (not shown) which can be economically used. Removal means 60 used here has a pertinent linear unit which can be moved in three axes to deliver a pretzel from the second position to the most remote third position on carrier 65 at a relatively short rate (for example less than three seconds). It is of course also conceivable to use other removal units in order to remove the finished pretzels from the pretzel shaping device according to the invention.

Figure 2:
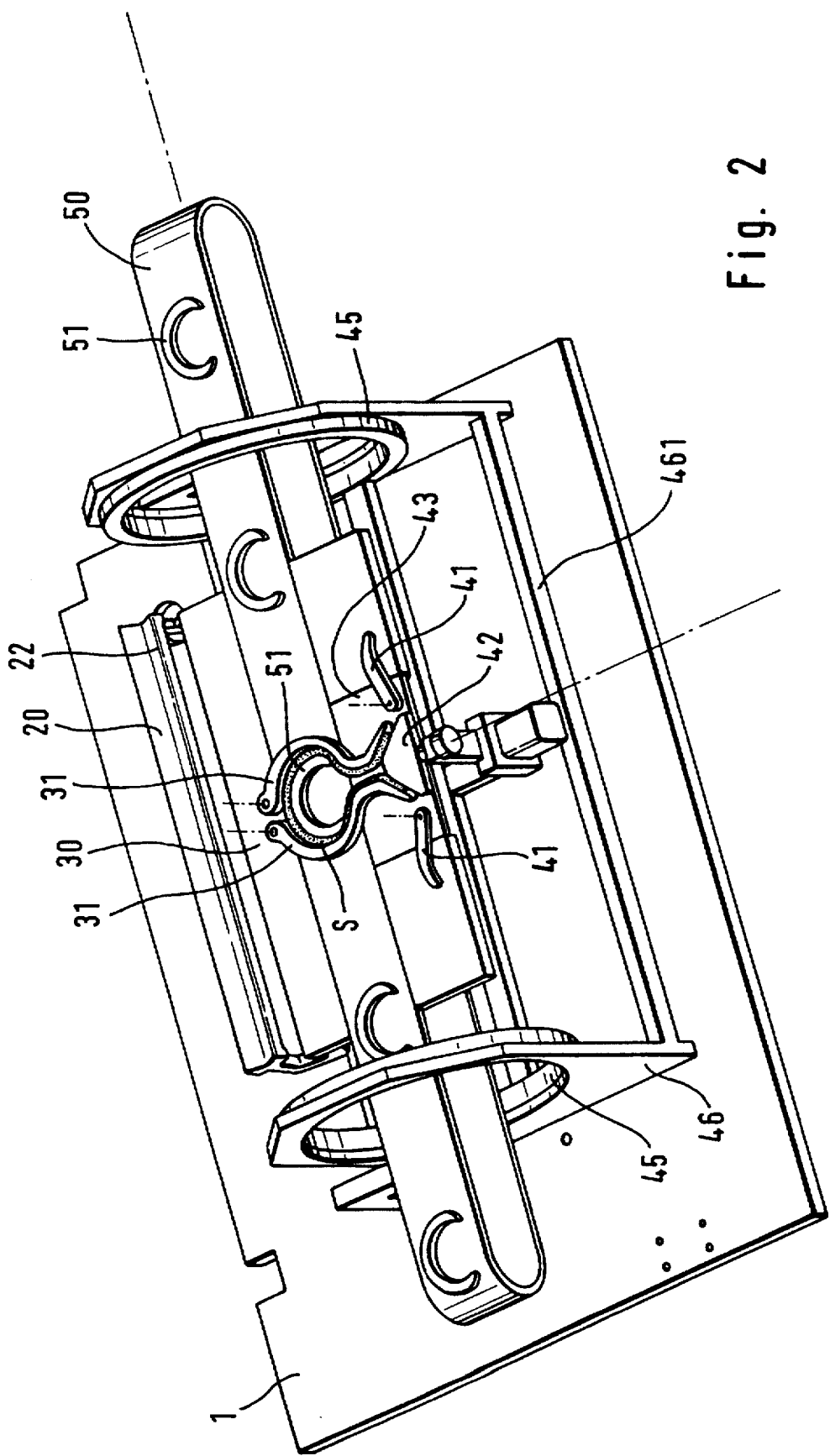
FIG. 2 shows a perspective view of the shaping device after closing the shaping flaps.
Figure 3:
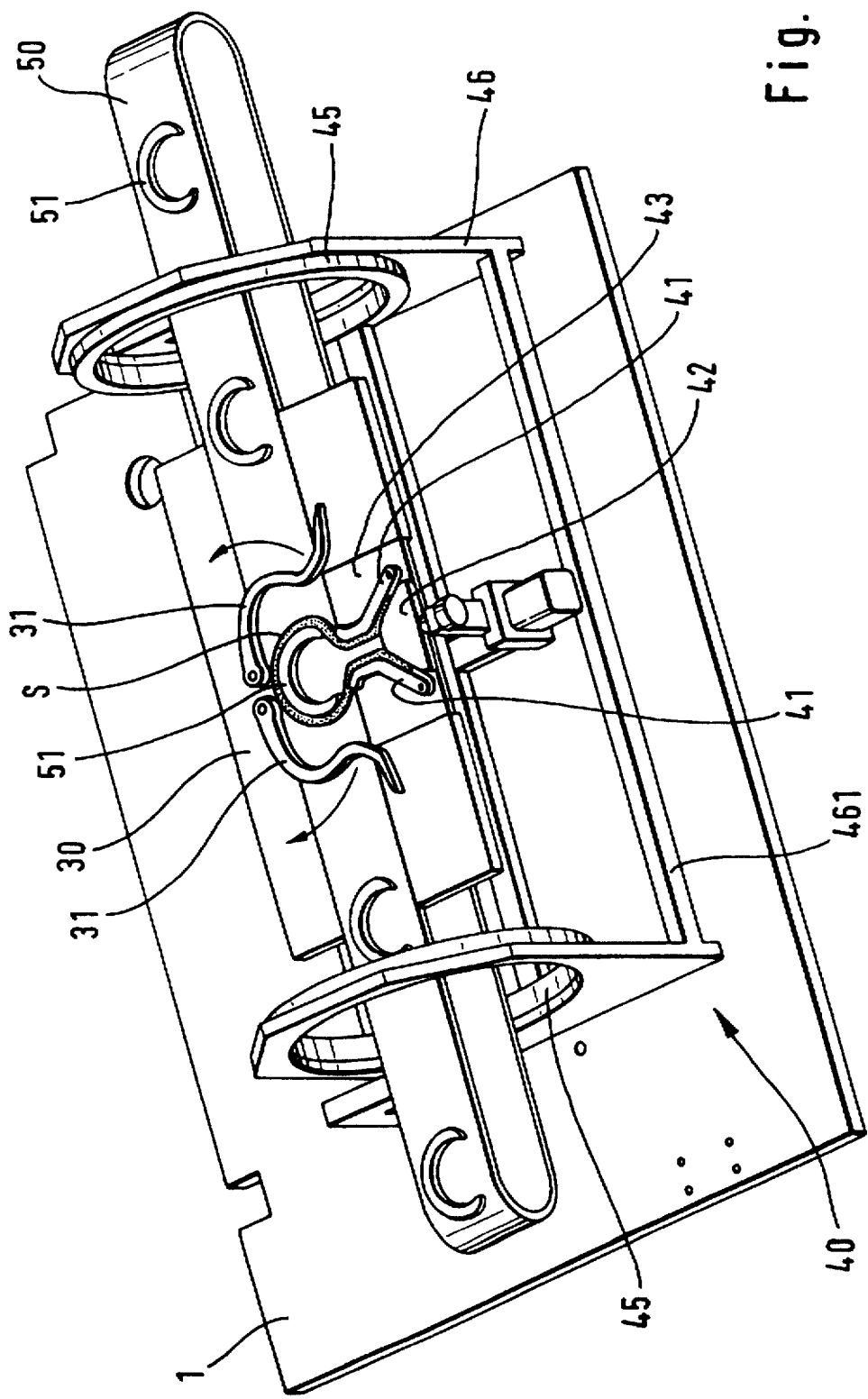
FIG. 3 shows the same view as FIG. 2, however the shaping flaps in their swivel-back motion and the clamp levers abutting the length of dough.

FIGS. 2 and 3 show the shaping device which stands on base plate 1 and which is taken from FIG. 1. It can be easily recognized here that length of dough S delivered by rocker 20 to belt conveyor 50 or its shaping plate 52 is formed into the shape of an omega by shaping flaps 31 which are shown in a position to be moved towards one another around shaping strip 51 of shaping plate 52, the ends of the length of dough come to rest on retaining plate 43. Clamp levers 41 which are located on retaining plate 43 are shown here in the position swivelled away from one another. Shaping flaps 31 which can be turned around the axes which are perpendicular to folding table 30 are shown in FIG. 3 after shaping of length of dough S in a position in which they are located on the return path back to folding table 30. At this time clamp levers 41 of the swivel means on retaining plate 43 have already been turned around the axes perpendicular to the retaining plate, come into contact with the ends of length of dough S and press them against shaping piece 42 of swivel means 40.

Figure 4:
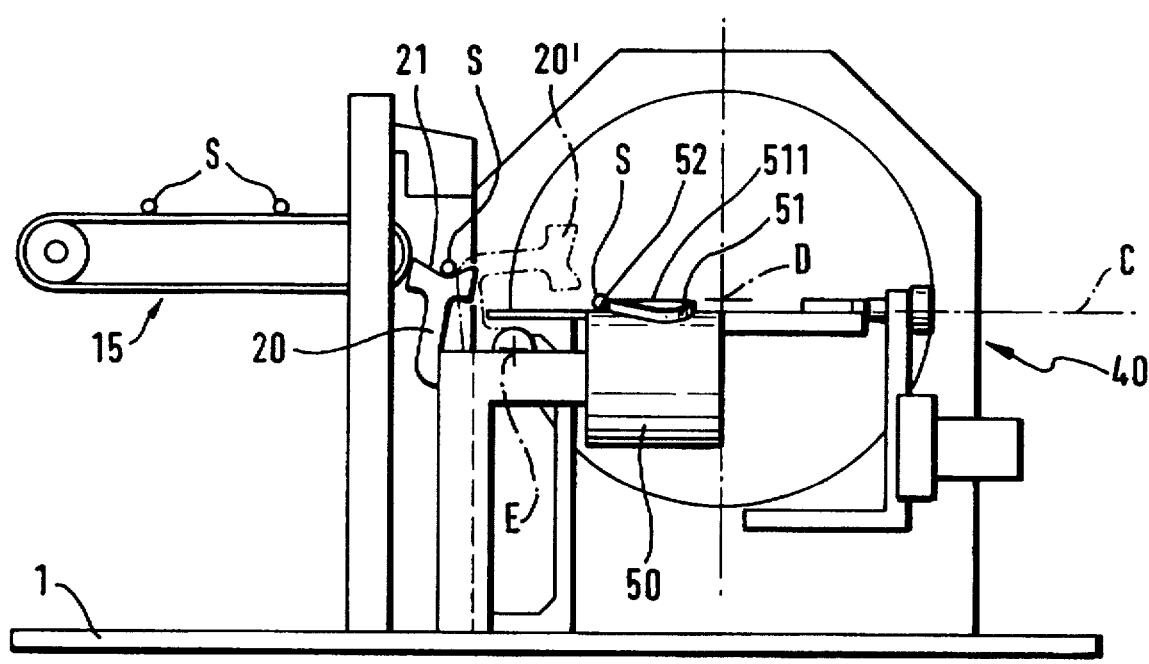
FIG. 4 shows schematically the shaping device viewed in the direction of the second axis.

FIG. 4 shows the conveyor path of length of dough S from timed conveyor 15 onto rocker 20 and from there onto belt conveyor 50. On rocker 20 shown here length of dough S lies on dough support surface 21. Rocker 20 is turned around axis E which is perpendicular to the plane of the drawing to deliver length of dough S onto belt conveyor 50 or its shaping plate 52. Thereupon the length of dough lies on shaping plate 52. It can be easily recognized here that shaping strip 51 has roughly the same height as the thickness of length of dough S. At the height of surface 511 of shaping strip 51 there runs axis D which is called the fourth axis, which is parallel to length of dough S in the unshaped position, which is perpendicular to the plane of the drawing, and around which, as the production process continues, swivel means 40 is swivelled by about 180° counterclockwise in the view shown here. However, beforehand the swivel means or retaining plate 43 of the swivel means on which the ends of length of dough S are held by clamping levers 41 against shaping piece 42 is turned about 360° around axis C which is called the third axis. Axis C lies parallel to the plane of the drawing and roughly at half the height between the surface of shaping plate 52 and surface 511 of shaping strip 51.

FIG. 16 shows the view of FIG. 4, expanded by a schematic representation of one advantageous development of the device according to the invention. Here it is described that timed conveyor 15 is preceded by preliminary straightening device 12 with important components chute 121 and rotary retaining flap 122. In the position of preliminary straightening device 12 which is shown chute 121 and retaining flap 122 form a trough into which length of dough S delivered by feeder 10 drops, in which it is immediately straightened lengthwise. This takes place solely by gravity. To be able now to straighten and move the length of dough along its longitudinal axis, in one advantageous development the device according to the invention can be equipped with sensors which ascertain the end of the length of dough which lies in the trough. The groove can be positioned to move along the longitudinal axis of the length of dough and according to the measurement result of the sensors can be conveyed to a desired position, for example, to one of the two ends of feeder 10, so that centering of the length of dough which takes place in the following on rocker 10 can proceed more quickly due to the now restricted faulty positions. It is advantageous to examine FIG. 16 in conjunction with FIG. 1 and to imagine preliminary straightening device 12 shown in FIG. 16 between the two elements feeder 10 and timed conveyor 15. In order to deliver the length of dough S from the trough of preliminary straightening device 12 onto timed conveyor 15, retaining flap 122 is turned from the position shown here in FIG. 16 by a small angle clockwise, so that length of dough S can drop onto the belt of timed conveyor 15. From there it is transferred on and treated in the aforementioned manner. Retaining flap 122 is afterwards turned back again in order to straighten next length of dough S. In FIG. 16 feeder 10 is shown not directly above the end of timed conveyor 15, but positioned following lifting device 18. It is especially advantageous when the machine which prepares or produces length of dough S, generally a so-called strand machine, delivers the length of dough in a vertical position which is located under the necessary vertical position of timed conveyor 15. Accordingly the strand machine will jettison the length of dough roughly along arrow 13 onto feeder 10 which is shown schematically here as a conveyor line. From feeder 10 with a carrying belt which moves to the right in this representation the length of dough is jettisoned onto the surface of conveyor belt 181 of lifting device 18 and is guided upward there from contact strip 182 straightened to the left until the length of dough following the upper reversal point of conveyor belt 181 drops into the aforementioned groove of preliminary straightening device 12. The individual elements of the feeder are advantageously matched to one another by means of a control so that timed conveyor 15 in a suitable amount per unit of time can be supplied with lengths of dough. Depending on the type and composition of length of dough S it is advantageous in some cases, additionally according to the view of FIG. 16, to place between feeder 10 and lifting device 18 preliminary straightening device 19 which functions analogously to device 12 in order to enable possibly even higher throughput. Contact strips 182 of lifting device 18 are more conveniently provided with a coating which prevents the length of dough from sticking to the lifting device and from being improperly released when it is jettisoned into the preliminary straightening device. Coating with textile fabric has proven very advantageous here. Surprisingly a rough textile fabric is able, even with strong stress on the device, to prevent the dough from adhering to the lifting device and its contact strip.

Figure 5:
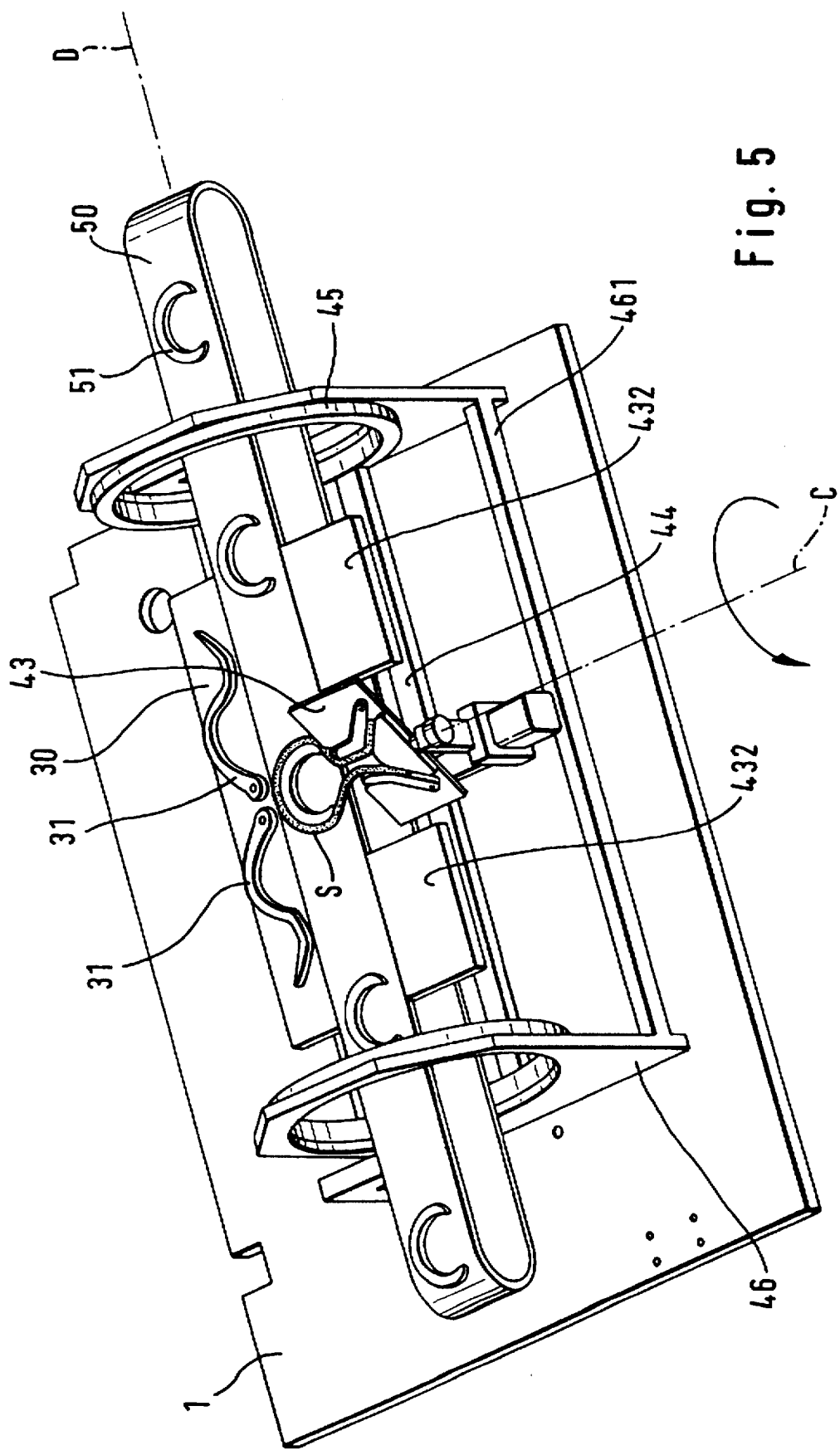
FIG. 5 shows the view as in FIG. 3, with the shaping flaps swivelled back and with the retaining plate during rotary motion.

FIG. 5 shows the device similarly to FIG. 3, in which here molding flaps 31 have been returned completely to their starting position on folding table 30 and retaining plate 43 has begun to turn according to the arrow, in the perspective drawing counterclockwise proceeding toward the rear. With this rotary motion around axis C entwining of the ends of the length of dough around one another is accomplished. Axis of rotation C here advantageously lies one half of the thickness of the length of dough over the shaping plate since at this height entwining can be accomplished in the optimum manner and a very uniform picture for the finished pretzel is enabled. In order that the length of dough which projects over the shaping plate in the direction of the retaining plate is not sheared off when the retaining plate is turned, the retaining plate is provided with recess 431 (FIGS. 1 and 7) on the open side of C-shaped shaping strip 51. Thus the ends of the lower part of the omega-shaped length of dough can be entwined around one another proceeding from the ends of the length of dough up to the location of the next mutual approach (entwining area) which represents the tip of a cone which is described upon rotation by about 360°. In doing so the elastic length of dough stretches somewhat.

Figure 6:
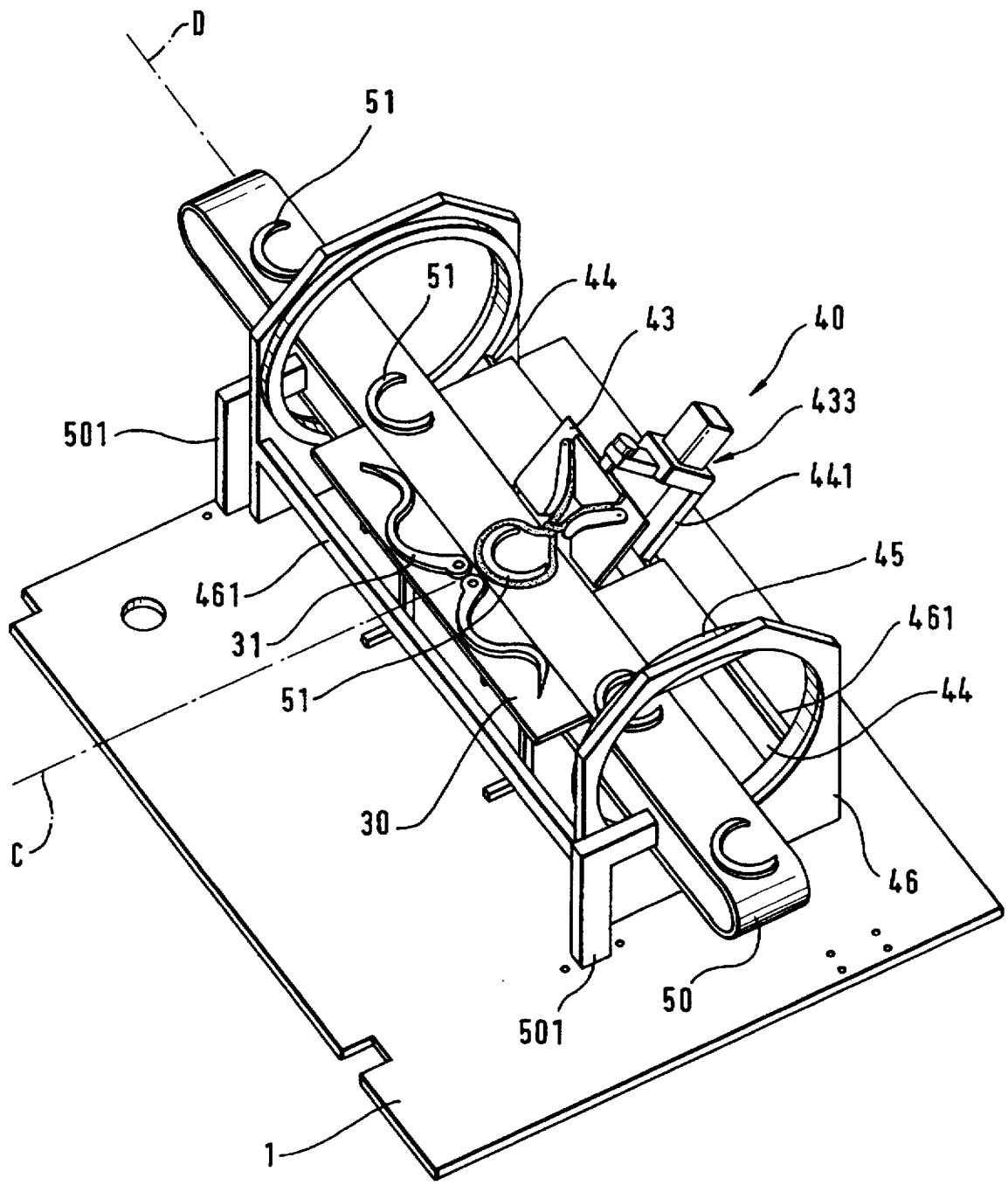
FIG. 6 shows the same view as in FIG. 5, however with the retaining plate during the swivel motion.
Figure 7:
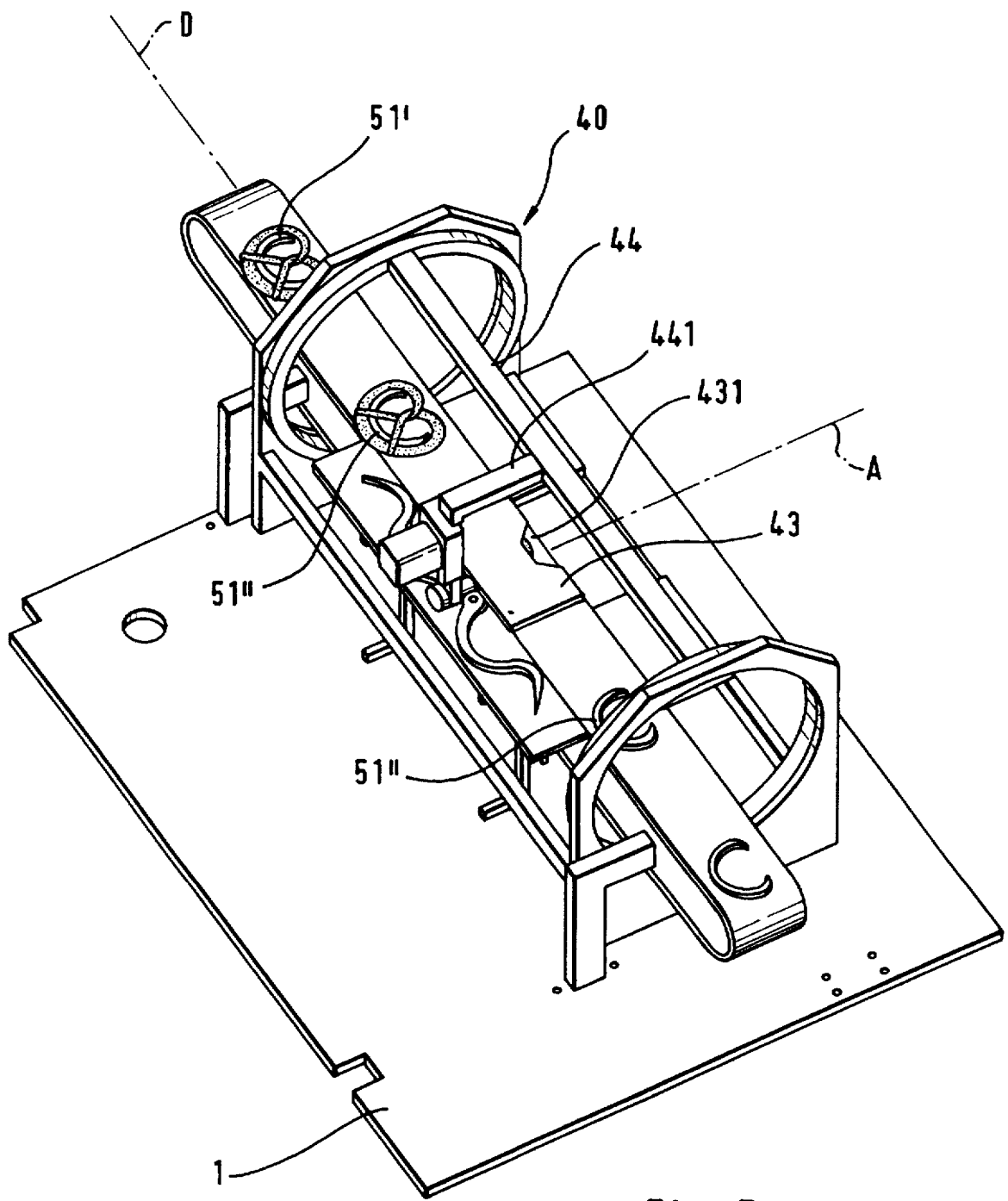
FIG. 7 shows the same view as FIG. 5, however after completed swivel motion of the retaining plate.

FIG. 6 shows another process step, specifically the start of swivel motion of retaining plate 43 around axis D after retaining plate 43 has executed one complete revolution around axis C and the ends of length of dough S have been looped around one another. It can be easily seen in this FIG. that retaining plate 43 is attached above its rotary drive 433 to crosspiece 44 of swivel means 40. Crosspiece 44 is joined to ring bearings 45 which are supported in stand 46 to turn around axis D. Strip 461 joins the two sides of stand 46 of swivel means 40, the sides carrying ring bearings 45. It is equally apparent in this Figure that belt conveyor 50 is attached on based plate 1 via mountings 501 independently of swivel means 40. FIG. 7 shows retaining plate 43 of swivel means 40, but this time from underneath, since in this position swivelling by about 180° around axis D has already been completed. The attachment of the mounting of retaining plate 43 with its rotary drive 433 via transverse strip 441 to crosspiece 44 of swivel means 40 can be easily recognized. If retaining plate has reached the position shown in FIG. 7 the finished pretzel cannot be seen since it is covered by retaining plate 43. Until completion of the 180° swivelling of retaining plate 43 around axis D the ends of length of dough S are clamped by clamp levers 41 against trapezoidal shaping piece 42. After completion of the swivelling motion clamp levers 42 are swivelled away by a short amount from shaping piece 42 in order to release the ends of the length of dough. Afterwards retaining plate 43 is again swivelled back by about 180° and then swivelled by a small angle of rotation farther than about 180° in order to reference the retaining plate again. Then, depending on the given design of rotary drive 433 of retaining plate 43, reversal by 360° is or is not done. This depends mainly on whether energy supply lines must be reversed to their original position or not. It is however also conceivable that the energy supply of the retaining plate and the clamping levers located thereon and other retaining devices are designed such that retaining plate 43 need not be reversed after 360° rotation. Rotary drive 433 of retaining plate 43 is advantageously a stepping motor. A pneumatic drive however can also chosen for this purpose. The same applies to preferably guided clamp levers 41 which are joined to one another by a gear drive or other lever rod and are swivelled via a pneumatic or electrical drive. The ends of length of dough S can however also be held differently here, specifically by means of an air flow which based on a negative pressure source acts on retaining plate 43 in the area in which the ends of length of dough S lie. During the time during which clamp levers 41 otherwise would be in the retained position, a negative pressure which would keep them in position on retaining plate 43 would then act on the ends of the length of dough.

FIG. 7 also shows very clearly how belt conveyor 50 extends lengthwise through the circular openings of ring bearings 45 of swivel means 40. In this representation several shaping strips are shown, the uppermost being labelled 51' in the drawing. This is specifically an advantageous position of shaping strip 51 in a so-called second position from which the removal device following the shaping device can retrieve the finished pretzel. More conveniently this takes place in the same time interval in which the shaping process described above takes place. This means that shaping strips 51 on shaping plates 52 located on belt guide 50 are at a distance to one another such that one length of dough S which lies on a shaping strip at a time can be worked simultaneously, either by shaping or by removing. The shaping strips labelled 51" in this case are in a waiting position. In FIG. 7, in contrast to FIG. 6, finished pretzels are shown in the two upper positions of shaping strips 51" and 51'.

It is of course also conceivable that a round table can be used instead of a belt conveyor 50 with shaping plate 52 located thereon. This round table can be arranged such that it turns around a vertical axis and always moves retaining plate 52 into the necessary position. This can take place according to the turret principle after various activities take place at the same time in different positions. Thus, the capacity can be increased by the possibility of several process steps taking place at the same time at different locations. For swivel means 40 used in this embodiment then two different round table sizes would be offered, in the larger one the path of the round table which carriers shaping plates 52 passing through ring bearings 45 of swivel means 40 and a smaller one, in which the path of the round table carrying shaping plates 52 is located only in the area between two ring bearings 45 of swivel means 40. The removal means and the entire periphery should then be adapted according to the arrangement of a round table. A completely differently configured swivel means is also conceivable.

Figure 13:
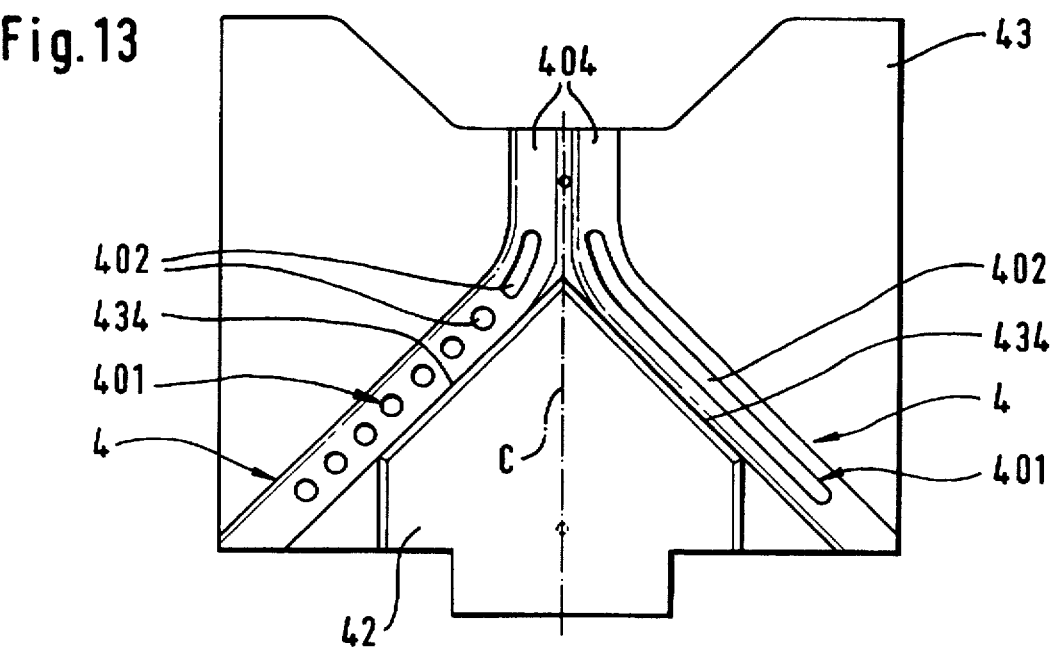
FIG. 13 shows the sample embodiment of the retaining plate detached from the device.
Figure 14:
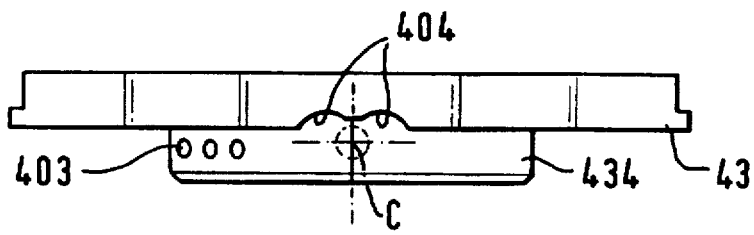
FIG. 14 shows the retaining plate from FIG. 13 from the side.
Figure 15:
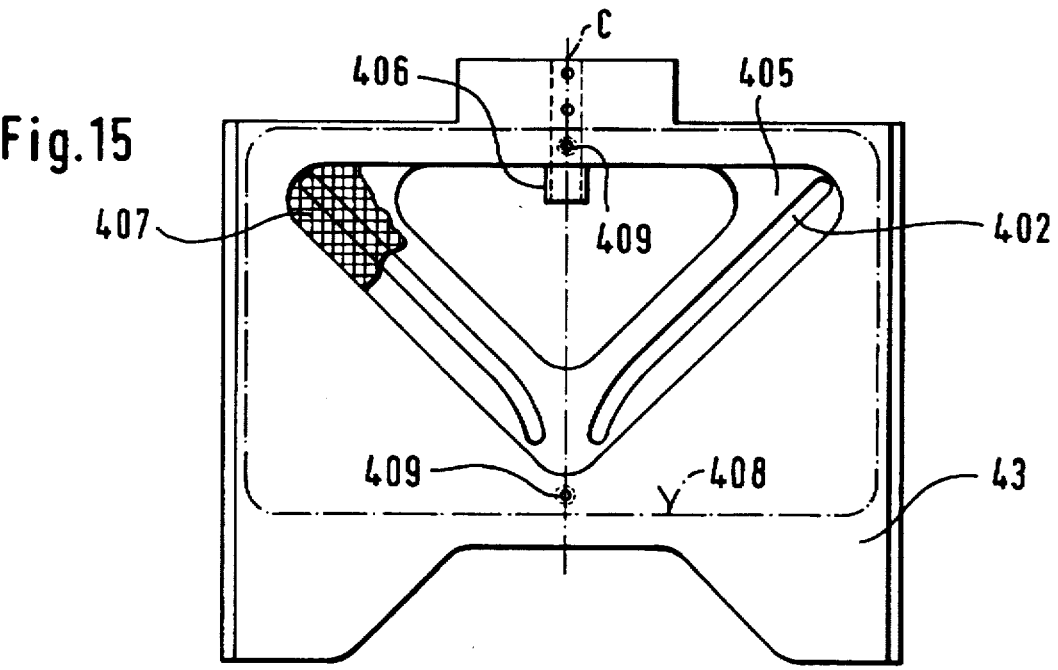
FIG. 15 shows the retaining plate from FIG. 12 from underneath.

FIGS. 13 through 15 show retaining plate 43 as an individual part, shown installed in the device in FIGS. 1 through 8, here a retaining device being described which is designed as an intake device 401. FIG. 13 shows an arrow-shaped shaping piece 42 which in actuality projects out of the plane of the drawing towards the observer. This shaping piece 42 is symmetrical to third axis C. Shaping piece 42 has two shaping surfaces 434 which are perpendicular to the plane of the drawing and which intersect in the axis of symmetry. Retaining device 4 described in this example can be recognized on suction channel 401 which passes through retaining plate 43. On the right side of the representation in FIG. 13 there is intake channel 401 in an elongated longitudinal hole. On the left side of the drawing the passage of intake channel 401 through retaining plate 43 is made in the form of individual openings 402.

FIG. 14 shows the retaining plate represented in FIG. 13 when it is viewed from overhead in the direction of axis C. In this view it can be easily recognized that retaining plate 43 in the area of openings 402 has cavities 404 with a radius which corresponds roughly to the radius of length of dough S to be worked. Shaping piece 42 can have openings 403 of intake channel 401 in another advantageous embodiment in shaping surfaces 434 of shaping piece 42. This is shown on the left side of FIG. 14. FIG. 15 shows the above described retaining plate 43 from underneath which is tightly covered by a roughly rectangular (not shown) sealing plate roughly in the form of outline 408, with for example rounded corners. The sealing plate is attached here by means of two screws which are screwed into thread 409. Use of a seal between cover plate 43 and the sealing plate is self-explanatory. In FIG. 15 a roughly V-shaped cavity 405 can be seen which is located roughly symmetrically to axis C and which extends in depth roughly to half the thickness of retaining plate 43. Furthermore, openings 402 of suction channel 401 can be recognized in this FIG. 15. A line connection piece labelled 406 is located concentrically with axis C for example. This connection piece can be hollow and can be the connection of intake channel 401, the connection joined to a compressor which is not shown here.

How the above described retaining plate with retaining device 4 integrated therein works is described in the following.

After shaping flaps 31 which are shown in FIGS. 1 through 8 have shaped length of dough S into an omega shape so that the ends of the length of dough which lie roughly in a V-shape abut shaping piece 42, it is these ends of the length of dough which lie over and/or next to openings 402 and/or 403 of suction channel 401, depending on which openings are provided. Instead of the above described turning of aforementioned clamp levers 41 intake channel 401 is supplied with negative pressure as it is connected to a side channel compressor, for example, so that in the area of openings 402, 403 of intake channel 401 a suction action on the ends of length of dough S takes effect. If at this point after the above described rotation of retaining plate 43 around so-called third axis C the ends of the length of dough are released, this can take place in two ways. Either only the connection of connecting channel 401 to the compressor is interrupted or the connecting channel is immediately joined to the pressure side of the compressor after interruption of the connection to the suction line of the compressor by means of a very fast switching shuttle valve, so that not only are the ends of length of dough S detached from the retaining device, but proper ejection takes place. Advantageously this saves a large amount of time and moreover has a cleaning effect on the openings of intake channel 401. The duration of the pressure impact can be adjusted to the consistency of the dough. This depends fundamentally on the location of the dough and on the climatic conditions of the kitchen. The cleaning effect is especially interesting when, as shown in FIG. 15, on the pressure side of openings 402 there is grate 407 or a grate-like or network-like structure, for example, of high quality steel. Grate or network 407 of this type can be used for a more uniform distribution of the pressure and suction force on the ends of the length of dough. The aforementioned switching valve which is not shown for the side channel compressor can also be used for switching from negative pressure to overpressure in removal means 60 which is described in greater detail later, in which instead of valve 611 described there a negative pressure/overpressure switching valve can be used, in order, as described above, to convert the intake force for length of dough S suddenly into an ejection force and thus also rapidly eject the shaped length of dough or pretzel in a controlled manner here with a simultaneous screen or grate cleaning effect.

Figure 8:
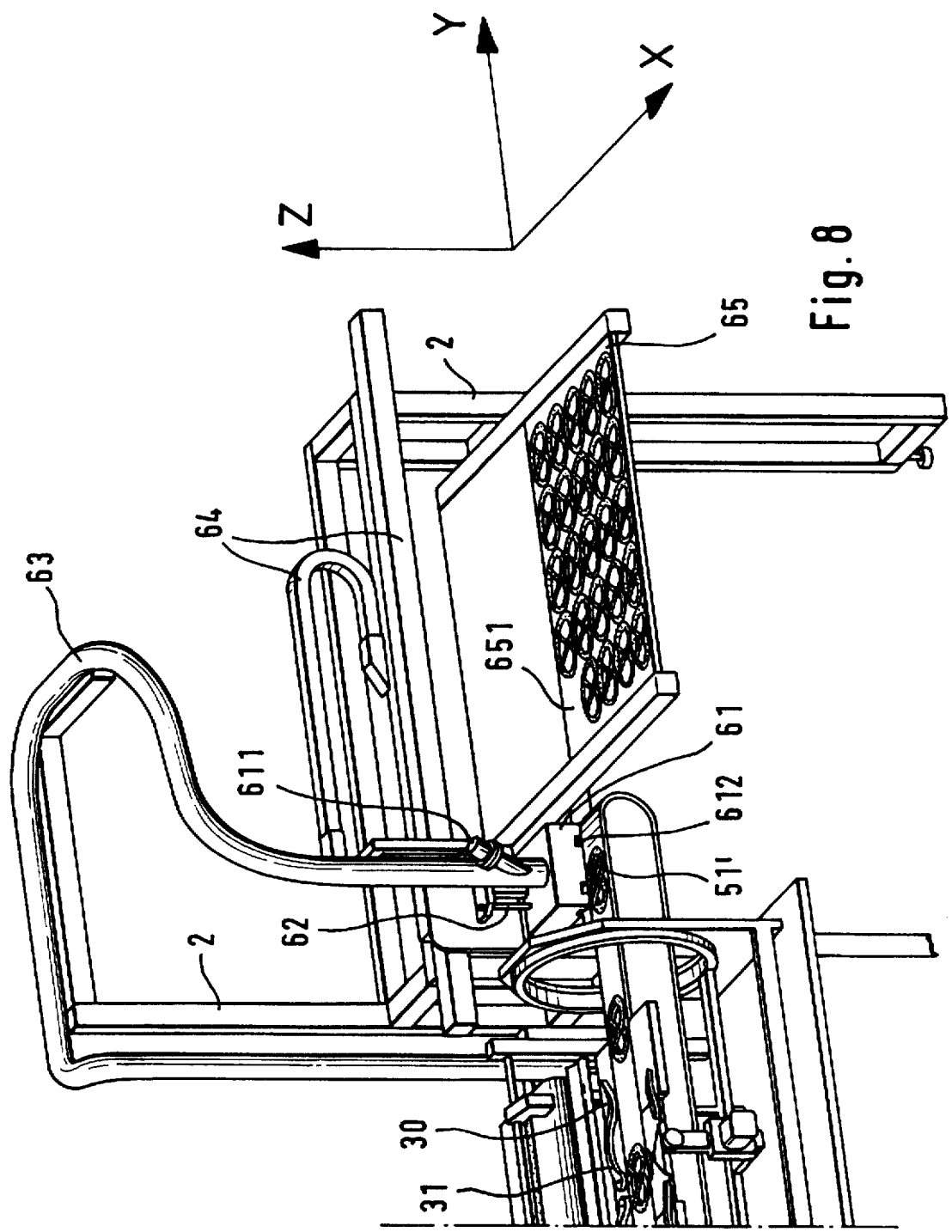
FIG. 8 shows a perspective view of the removal means, with the gripper unit shortly before a pretzel is removed from the shaping plate.

FIG. 8 shows the removal device which is efficiently connected downstream to a shaping device according to the invention, in the form of a linear unit which also uses pertinent positioning and palletizing processes. The particular feature of the removal device used here is the gripping means which is made in the form of suction box 61. This suction box has a concave outline of a pretzel which is shaped according to the invention, impressed from underneath, into which holes proceeding from within the vacuum box project. Suction line 63 joins suction box 61 to a side channel compressor (not shown) which supplies the interior of the suction box with negative pressure via a slanted seat valve which is not shown and which switches very rapidly (preferably between 0.1 and 0.15 bar). In order to enable sufficient air to flow through suction box 61 which is lowered onto the finished pretzel in position 51' and with the slanted seat valve connected, in order to securely hold the pretzel thereon, the suction box is provided with notches 612 on the side. This ensures that there is an air flow necessary for gripping the pretzel. The pretzel which lies in position 51' is transported following the position of the entire configuration shown in FIG. 8 to point 651 of carrier 65. More conveniently there is a pressure unit in the form of pressure pistons in the suction box at the point where the ends of the length of dough are pressed onto the circular part of the original length of dough which has been shaped into an omega onto length of dough S in order to be joined to the underlying length of dough and to achieve a pretzel outline which is roughly the same height. The pressure pistons are more conveniently integrated into the suction box itself and press the ends of the length of dough downward shortly before the pretzel is raised by negative pressure. Pressure pistons 62 can be controlled by electric motors, electromagnets, or even pneumatically. When pretzel carrier 65 has been completely filled by removal means 60, new carrier 65 can be made available with the pertinent changing means in order to enable a production and removal sequence without delays. The respective position of the different parts of the device as is shown in FIG. 8 does not actually occur in the normal course of the process. The positions shown here are cited at the same time only for demonstration purposes. To tighten the time sequence as much as possible the individual process steps are placed as close to one another as possible. In the situation shown here, specifically with opened shaping flaps 31 on folding table 30 and with retaining plate 43 which is swivelled back and turned back after shaping of length of dough S, suction box 61 would have to lie directly on the pretzel which is in position 51' in order to grip it since at the next instant the belt conveyor will move its surface which contains shaping plate 52 in the Y direction in order to then receive a new length of dough for shaping.

Suction box 61 of removal means 60 in this embodiment is more conveniently equipped with integrated pistons 62 for pressing the ends of the length of dough. The two process steps, pressing the ends of the length of dough and removing the finished pretzel from the belt conveyor or the shaping device, can however be carried out completely independently of one another and also by completely independent devices. Nor is it necessary that the finished pretzels be removed by a suction device as described above. Some other suitable gripping device can also be used. Suction box 61, in order to protect the side channel compressor against overly severe fouling, is preferably covered with an elastic knitted fabric or cloth 613 which easily lies against pretzel outline 617 which is impressed in suction box 61 and catches possible dirt, however no major energy loss being caused thereby.

Figure 10:
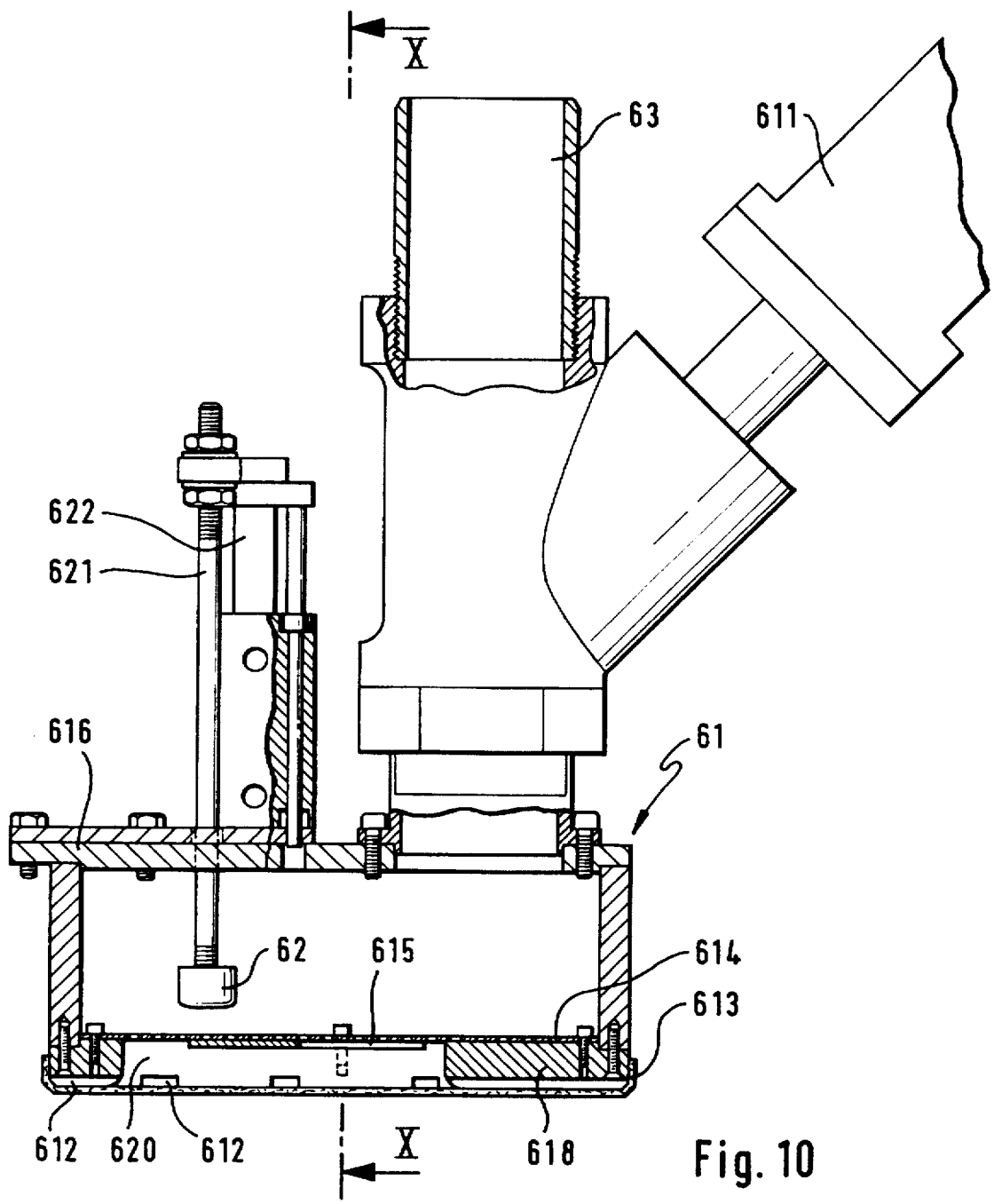
FIG. 10 shows in cross section a gripper unit designed as a suction box.
Figure 12:
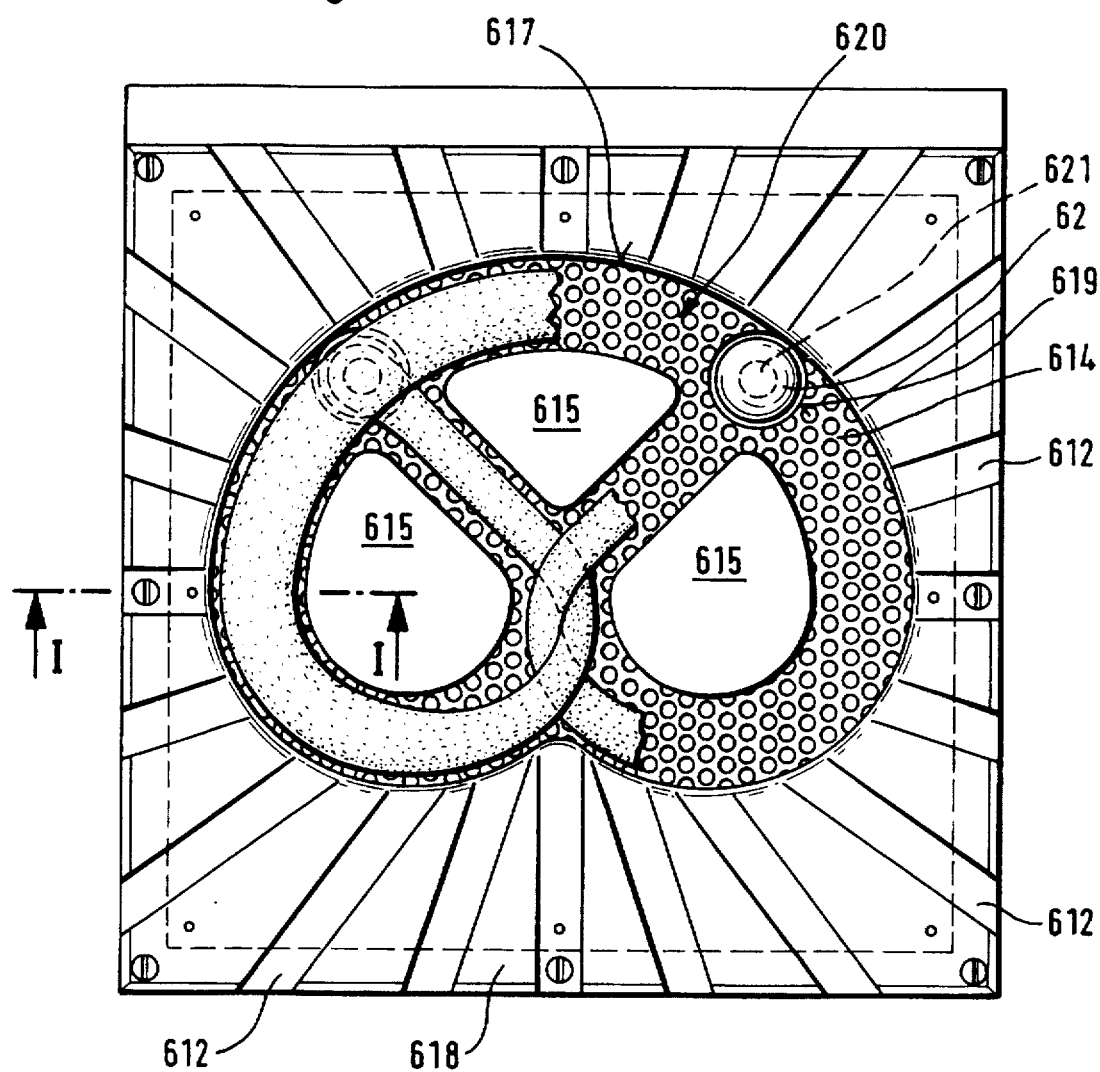
FIG. 12 shows the gripper unit from FIG. 10 from underneath without fabric.

FIG. 10 shows one embodiment of suction box 61 with the connection to suction line 63 and valve 611 which interrupts the suction flow. Suction box 61 is shown here from the side with two side walls, cover 616 and perforated sheet metal plate 614 which closes the box from underneath. This perforated sheet metal plate 614 is attached to bottom plate 618 from the bottom and covers from the inside pretzel outline 617 which is cleared in bottom plate 618 (FIG. 12). In order to cover on perforated plate 614 the inner outline of the pretzel and the space of the perforated sheet plate which lies therein and which contains no pretzel, coverings 615 are attached. The cavity of bottom plate 618 matched to pretzel outline 617 passes from the outer surface via a rounded curve into a peripheral pretzel outline surface which extends essentially vertically and which ends on perforated plate 614. Over bottom plate 618 preferably a fabric or knit is drawn which is elastic and which rests against the surface formed by bottom group 618, 615 when the negative pressure is turned on, so that the finished pretzel is located in the major axis in space 620. Piston shaft 621 which has plunger 62 on its lower end extends through cover 616 of suction box 61, the cover being opposite bottom plate 618.

Figure 11:
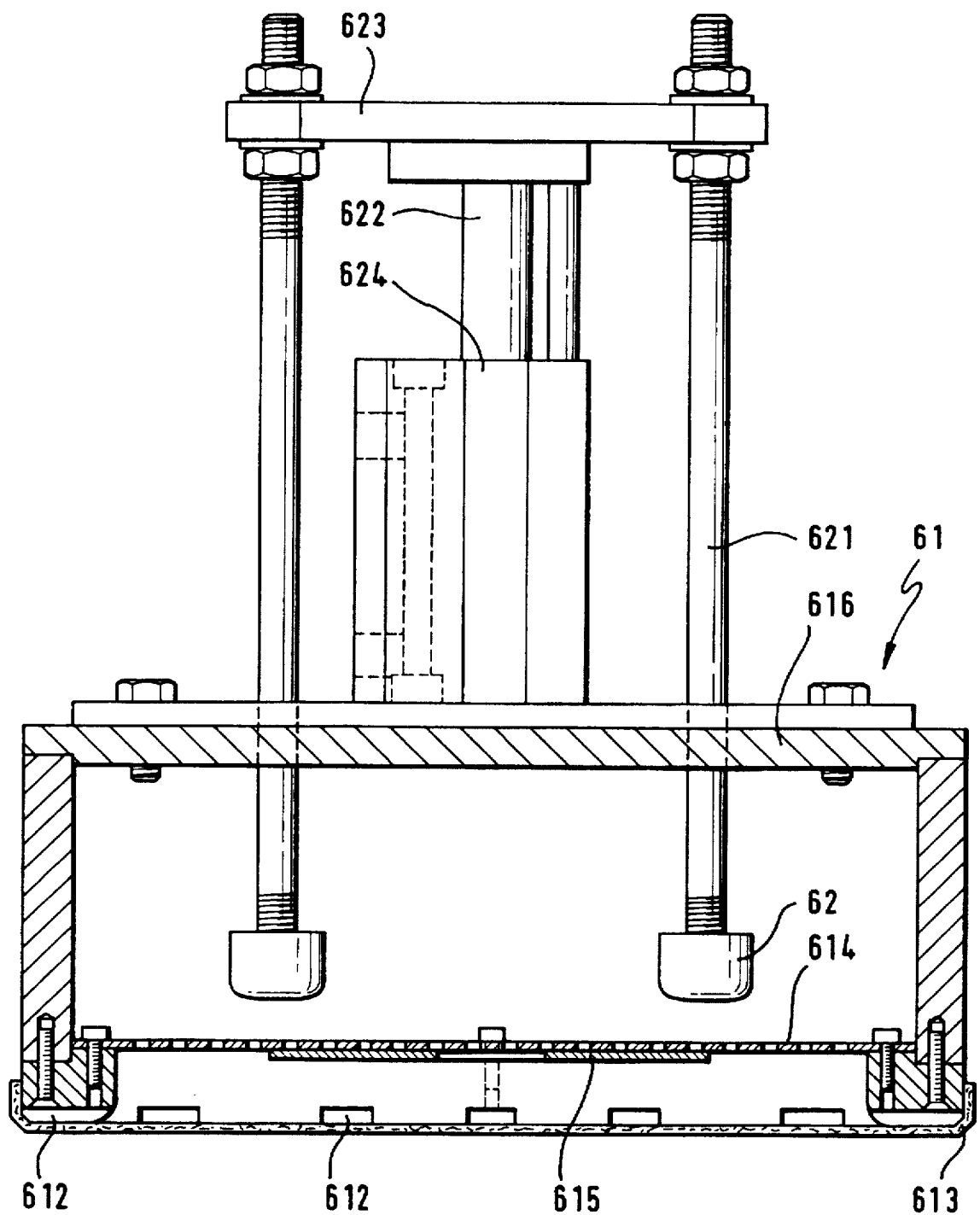
FIG. 11 shows the gripper unit in section X—X according to FIG. 10.

Piston shaft 621 is connected via connecting bridge 623 (FIG. 11) to lifting piston 622 of hydraulic cylinder 624 which, in order to eject plunger 62, can be supplied with pressure or negative pressure depending on the manner of switching in order to move plunger 62 through openings 619 of perforated plate 614 which are shown in FIG. 12 in order in turn to press the pretzel or the ends of its length of dough located in space 620 onto the part of length of dough S which originally lies in a circle. To reliably hold the finished pretzel in space 620 on perforated plate 614, around external outline 617 of the pretzel-shaped cavity in bottom plate 618 there are notches 612 which extend radially to the outside from the center of the bottom plate. These notches 612 ensure that enough air can flow into suction box 61 so that based on the resulting air flow the necessary force for lifting the pretzel which is in space 620 is present. Use of suction box 61 with elastic fabric 613 is not absolutely necessary. The device also works without this fabric. It is however more advantageous to provide the device with this fabric 613 in order to prevent fouling of the device. In the previous description generally plunger 62 and pertinent piston shaft 621 were addressed. As is shown in FIG. 11, two plungers 62 at a time are meant, which, as shown here, are located parallel to one another and press the ends of the length of dough against the circular part of the finished pretzel. FIG. 12 shows suction box 61 or its bottom plate 618 from underneath with recessed pretzel outline 617 which is covered from inside with perforated plate 614. The formation of the inner outline by attachment of coverings 615 can be very easily recognized here. In the part of the bottom plate which is the left one in FIG. 12, part of a pretzel is shown as it comes to rest in space 620 in front of or under perforated plate 614. The end of the length of dough pressed against the circular part of the pretzel is shown by a broken line here. Between the outside edge of the pretzel and the pretzel outline in bottom plate 618 of the suction box is a distance of a few millimeters. This intermediate space allows enough air to flow into the suction box to efficiently grip the pretzel and hold it. For this reason notches 612 arranged in a star-shape are also worked into bottom cover 618 of suction box 61.

Figure 12A:
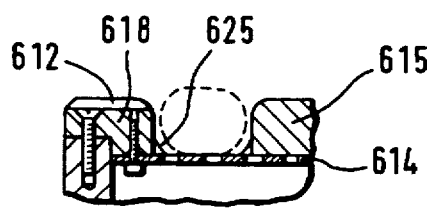
FIG. 12a shows by way of an extract cross section I—I from FIG. 12.

In FIG. 12a it is to be shown that for better and more accurate air guidance to hold length of dough S by bottom plate 614 there can be indentations 625 in order to limit the infiltrated air which flows around the length of dough shown by the broken line. It is also shown in this Figure that cover 615, as shown in FIGS. 10 and 11, can have not only a low height, but also can be made the same height as bottom plate 618. In the version of suction box 61 described here, as already mentioned above in the description of one version of retaining plate 43, instead of valve 611, a fast switching valve can be used. Thus the negative pressure on perforated plate 614 of suction box 61 can be switched in an instant to an overpressure in order to eject the pretzel very quickly in an entirely controlled manner. This approach is advantageously supported by indentations 625 on bottom plate 614 which can be individually matched to a desired shape of the length of dough. It should also be mentioned here once again that suction/pressure switching entails an advantageous cleaning effect.

Figure 9:
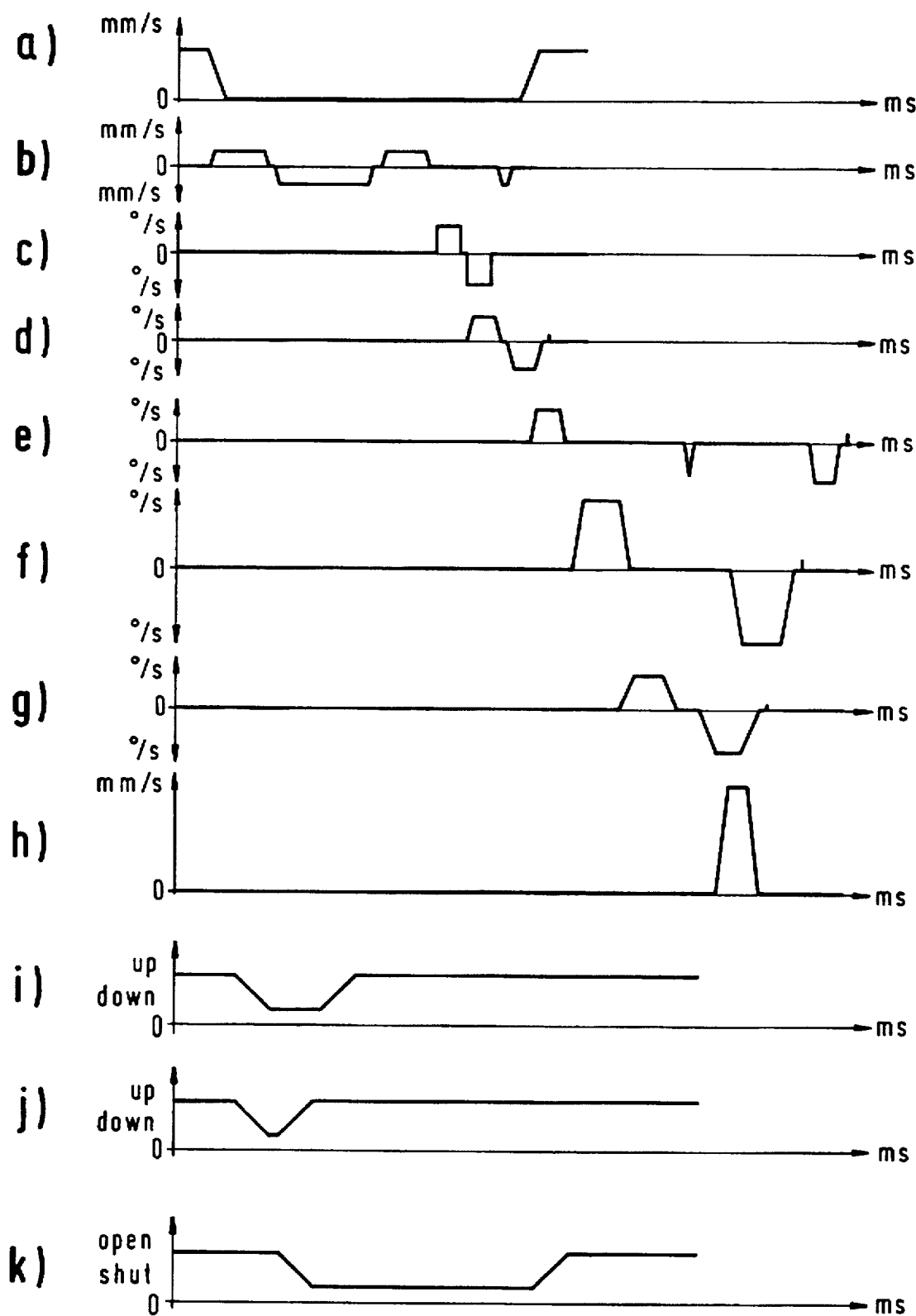
FIG. 9 shows a diagram with which the individual process steps of the production process are explained.

To summarize once again the manufacture of a pretzel, the course of the process is described using FIG. 9 which shows a time-travel diagram of the individual process steps of the individual units of the device. The coordinate axes depicted here show either speeds (y-axis) or time (x-axis). In this case, in diagram a the function of timed conveyor 15 is shown which comes to a rest while rocker 20 (diagram b) has already begun its centering motion into one of the two directions of motion. Rocker 20 then travels via its middle position (0) in the other direction and according to the stipulation of the SPS positions length of dough S in the center to an axis of symmetry called first axis A. Afterwards, according to diagram c the rocker is swivelled about 75° around axis E to deliver length of dough S to shaping plate 52. While according to diagram d shaping flaps 31 begin their swivel motion, rocker 20 according to diagram c swivels back by 75° into its rest position. Afterwards the centering device integrated into rocker 20 according to diagram b returns to its zero position. Shaping flaps 31 have then completed their dough shaping motion by about 90° and move back to folding table 31. During this movement, and after they have swivelled out of the swivel range of clamp levers 41, the latter (diagram e) begin their swivel motion by about 115° in order to clamp the ends of the length of dough. During this movement of the clamp levers shaping flaps 31 are moved approximately 1° beyond their zero position in order to re-reference themselves. After clamp levers 41 according to diagram e have clamped the ends of the length of dough to piece 42, retaining plate 43 begins its rotary motion by 360° (diagram f). Before this is completed, according to diagram g, swivel motion around axis D can begin in order to save time. But this is not necessary for successful continuation of the process. When the 180° swivel motion of retaining plate 43 is completed, according to diagram e clamp levers 41 are opened by a short angle of 15°, in order to release the ends of the length of dough. Thereupon, according to diagram g retaining plate 43 is swivelled back into its original position. During this swivelling-back motion also according to diagram f the motion of turning back of retaining plate 43 by 360° around axis C is begun. Both motions of swivelling and turning back are followed by brief swivelling/turning beyond the zero point in order to re-reference the devices. If retaining plate 43 has again returned to its original position in the first plane, clamp levers 41 according to diagram e are returned to their starting position and referenced there. According to diagram h belt conveyor 50 is set in motion while retaining plate 43 is being swivelled back in order to transport shaping strip 51 with the finished pretzel on it in the removal direction, specifically from the first position via axis of symmetry A to second position 51' (FIG. 7). The above described referencing of individual parts of device means that, in order to compensate for the play which is inevitable in machine building, it will complete the turning or swivelling means [sic] beyond a zero point in order to approach a reference point there, from which a new zero point adjustment or calibration takes place. This is not absolutely necessary, but it is extremely advantageous for faultless operation of a device of this type.

If belt conveyor 50 has moved the finished pretzel into second position 51' and stopped, suction box 61 of removal means 60 drops onto the pretzel according to diagram i. Rather simultaneously plungers 62 integrated in suction box 61 begin their motion to the ends of the length of dough of the pretzels and press against them. Shortly thereafter the pressure pistons according to diagram j are raised again. Valve 611 which is inserted into suction line 63 opens according to diagram k and results in a negative pressure which acts on the pretzel and which is routed through the side channel compressor which is not shown via suction line 63 to suction box 61. Thereupon the pretzel is held. Suction box 61 then moves back up according to diagram e after the pressure pistons have been moved upward. The linear unit integrated in removal means 60 can then move the pretzel into a position on carrier 65 and after the negative pressure valves closes can deposit the pretzel on carrier 65 and move back into the second position via belt conveyor 50 over a pretzel which has just been finished there.

The entire process sequence and these parts of the device are more conveniently controlled by an ordinary commercial memory programmable control (SPS). To describe this seems superfluous since its use is appropriate.

The execution of the invention is not restricted to use of the above described drives, but can also be implemented with other feasible drive means. This device which can be operated according to the process according to the invention makes it possible to produce pretzels in large numbers. With it an hourly yield of more than 1500 pretzels can be achieved.

We claim:

1. A process for producing pretzels which are shaped from cut lengths of dough having a substantially round cross-section supplied in stretched form wherein a length of dough is partially fed onto a first surface in a first plane of a shaping device and partially onto a second surface in said first plane and wherein an intermediate portion of the length of dough is placed about a shaping strip on said first surface, first and second right angularly related axes in said first plane with said second axis lying substantially coincident with a juncture between said first surface and said second surface, comprising the steps of:

shaping said length of dough on said first plane in the approximate shape of an omega;

fixing end portions of said length of dough in an approximate V-shape on said second surface;

rotating said second surface about 360° about a third axis generally parallel to said first axis and spaced above said plane to entwine said end portions with one another;

pivoting said second surface about 180° about a fourth axis generally parallel to said second axis and spaced above said plane to overlay said end portions onto remaining portions of said omega-shaped length of dough and into the general shape of a pretzel; and detaching said end portions of the length of dough from said second surface.

2. A process according to claim 1 wherein said third axis is spaced above said plane a distance substantially about one-half of the thickness of said length of dough from said first axis and said fourth axis is spaced above said plane a distance substantially corresponding to the thickness of said length of dough above said second axis.

3. A process according to claim 1 including, prior to shaping the length of dough, transferring the length of dough to a centering and straightening device, straightening the length of dough, centering the length of dough relative to the shaping device and delivering the length of dough to said shaping device.

4. A process according to claim 3 wherein the step of straightening includes straightening the length of dough lengthwise and transversely.

5. A process according to claim 3 including moving said length of dough into a position generally parallel to said second axis, ascertaining the position of the length of dough relative to said shaping strip and moving the length of dough in a longitudinal direction to substantially center the length of dough relative to the shaping strip.

6. A process according to claim 5 including placing the length of dough on a rocker, moving the length of dough into a position generally parallel to said second axis, moving the length of dough back and forth by said rocker along an extended direction of said length of dough between at least two sensors, ascertaining the positions of ends of the length of dough on said rocker by said sensors thereby determining the middle of said length of dough, centering the length of dough in front of said shaping strip by moving said rocker lengthwise, measuring the length of the length of dough while centering, comparing the measured length of the length of dough to a set length and then jettisoning the length of dough from the first surface when there is a large deviation from the set value after shaping.

7. A process according to claim 1 including moving said first surface from a first position to a second position, lifting the length of dough shaped into a pretzel from said first surface and depositing said length of dough onto a third surface.

8. A process according to claim 7 including pressing said end portions of said length of dough on a circular portion thereof prior to lifting.

9. A process according to claim 1 including controlling said process by a memory programmable control in which different process steps are initiated before preceding process steps are completed.

10. A device for producing pretzels comprising:

a shaping device for a length of dough, said device having a first surface lying in a first plane and including a shaping plate and a second surface including a retaining plate in said first plane;

first and second right angularly related axes in said first plane with said second axis lying substantially coincident with a juncture between said shaping plate and said retaining plate;

said retaining plate being mounted for about 360° of rotation about a third axis spaced above said first plane and substantially parallel to said first axis;

said retaining plate being mounted for about 180° rotation about a fourth axis spaced above said first plane and generally parallel to said second axis;

a substantially C-shaping strip carried by said shaping plate and opening toward said retaining plate for arcuately shaping a portion of the length of dough, said C-shaped strip being substantially symmetrically divided by said first axis;

a foldable table on the side of said shaping plate opposite said retaining plate and lying in said first plane; and two shaping flaps carried by said table lying on respective opposite sides of said first axis and rotatable about axes substantially perpendicular to said first plane for movement toward and away from said shaping strip.

11. A device according to claim 10 wherein said retaining plate has a recess opening toward the open side of said C-shaped shaping strip;

a shaping piece on said retaining plate opposite said recess and which is symmetrically divided by said first axis and which projects from said first plane, said shaping device having two shaping surfaces forming a generally V-shape relative to one another and which intersect in a plane of symmetry passing through and normal to said first axis, a retaining device on opposite sides of said shaping piece in opposition to said shaping surfaces.

12. A device according to claim 11 wherein said third axis lies a distance approximately one-half the thickness of a length of dough from said first axis.

13. A device according to claim 11 wherein said fourth axis lies a distance approximately a full thickness of a length of dough from said second axis.

14. A device according to claim 11 including shaping flaps each having an approximate shape of half of a vertically divided omega, said flaps being carried for rotation from a start position on said folding table into a shaping position on said retaining plate.

15. A device according to claim 11 wherein said shaping flaps have a rotary drive for guided movement relative to one another.

16. A device according to claim 11 including a conveyor belt, said shaping plate being located on said conveyor belt and movable transversely with said belt from a first position aligned with said first axis in the first plane.

17. A device for producing pretzels according to claim 16 including removal means for picking up a formed pretzel from said second position of said shaping plate and depositing it on a carrier.

18. A device according to claim 10 wherein said retaining device comprises an intake device having an intake channel.

19. A device according to claim 18 wherein said intake channel is joined to a suction side and to a pressure side of a compressor.

20. A device according to claim 18 including a dough-supply means, said dough-supply means including a timed conveyor, a centering and straightening device, and a dough delivery means, said centering and straightening device preceding said timed conveyor.

21. A device according to claim 20 wherein said centering and straightening device includes a longitudinal straightening means and a transverse straightening means.

22. A device according to claim 20 wherein said dough-supply means includes feeding means, said timed conveyor including conveyor belts and means for controlling the positions of said timed conveyor belts and said feeding means.

23. A device according to claim 20 wherein said straightening and centering device has a rocker movable in both directions of said second axis, said rocker being rotatable about a fifth axis which is below and parallel to said second axis.

24. A device according to claim 23 wherein said rocker has a support surface inclined to said first plane in a dough support position, said support surface being rotatable about a fifth axis in the direction of said shaping plate such that the length of dough is delivered to said shaping plate between said shaping strip and said shaping flaps when in positions spaced away from said shaping strip.

25. A device according to claim 20 wherein the straightening and centering device has at least two sensors, each located approximately a distance of one-half the length of a strand of dough from said first axis and on opposite sides thereof.

26. A device according to claim 10 wherein said retaining plate has cavities in an area of said retaining device.

27. A device according to claim 10 including a gripper unit movable in three axial directions perpendicular to one another, said unit having a surface matched to the outline of the length of dough shaped into a pretzel.

28. A device according to claim 27 wherein said gripper unit includes a suction box having a pretzel-shaped cavity and a row of holes arranged in the shape of a pretzel in said cavity, said cavity being bordered by edges having notches extending from the cavity and opening externally of the suction box; and an elastic fabric covering for said suction box.

29. A device according to claim 28 wherein said gripper unit has plungers carried by a suction box for pressing the end portions of the shaped pretzel onto the arcuate shaped portion of the length of dough.

* * * * *